United States Patent
He (10) Patent No.: US 9,970,491 B2
(45) Date of Patent: *May 15, 2018

(54) WEDGE FRICTION CLUTCH WITH ONBOARD ENABLE AND DISABLE FUNCTION

(71) Applicant: Schaeffler Technologies AG & Co. KG, Herzogenaurach (DE)

(72) Inventor: Simon Xunnan He, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 243 days.

This patent is subject to a terminal disclaimer.

(21) Appl. No.: 14/795,621

(22) Filed: Jul. 9, 2015

(65) Prior Publication Data

US 2016/0032988 A1 Feb. 4, 2016

Related U.S. Application Data

(60) Provisional application No. 62/032,079, filed on Aug. 1, 2014.

(51) Int. Cl.
*F16D 41/063* (2006.01)
*F16D 25/06* (2006.01)
*F16D 41/08* (2006.01)
*F16D 15/00* (2006.01)

(52) U.S. Cl.
CPC ......... *F16D 41/063* (2013.01); *F16D 41/082* (2013.01); *F16D 15/00* (2013.01); *F16D 25/06* (2013.01)

(58) Field of Classification Search
CPC ........ F16D 41/063; F16D 25/06; F16D 25/00; F16D 41/06; F16D 15/00
See application file for complete search history.

(56) References Cited

U.S. PATENT DOCUMENTS

| | | | |
|---|---|---|---|
| 5,638,929 A * | 6/1997 | Park | F16D 15/00 192/30 V |
| 2009/0159390 A1 | 6/2009 | Davis | |
| 2013/0248317 A1* | 9/2013 | Lee | F16D 13/40 192/70.11 |
| 2014/0014455 A1* | 1/2014 | Davis | F16D 41/063 192/45.1 |
| 2014/0110207 A1* | 4/2014 | Davis | F16D 41/08 192/45.1 |
| 2014/0332335 A1* | 11/2014 | Strong | F16D 41/06 192/43 |

(Continued)

*Primary Examiner* — Ramya P Burgess
*Assistant Examiner* — Lillian T Nguyen (57) ABSTRACT

A wedge friction clutch with onboard enable and disable function, including: an axis of rotation; an inner race; an outer race located radially outward of the inner race; and a wedge assembly including at least one wedge plate located between the inner and outer races in a radial direction; at least one resilient element; and at least one piston. For a locked mode in which the inner and outer races are non-rotatably connected, the at least one resilient element is arranged to displace the at least one wedge plate in at least one first circumferential direction. For a free wheel mode in which the inner and outer races are independently rotatable with respect to each other, the at least one piston is arranged to displace the at least one wedge plate in at least one second circumferential direction.

20 Claims, 8 Drawing Sheets

(56) References Cited

U.S. PATENT DOCUMENTS

2016/0138662 A1\* 5/2016 He ................. F16D 41/063
                                                  192/45.1
2016/0298702 A1\* 10/2016 He ................. F16D 25/062

\* cited by examiner

WEDGE FRICTION CLUTCH WITH ONBOARD ENABLE AND DISABLE FUNCTION

CROSS-REFERENCE TO RELATED APPLICATIONS

This application claims the benefit under 35 U.S.C. § 119(e) of U.S. Provisional Patent Application No. 62/032,079, filed Aug. 1, 2014, which application is incorporated herein by reference in its entirety.

TECHNICAL FIELD

The present disclosure relates to a wedge friction clutch with onboard enable and disable function. In particular, the clutch includes a wedge plate, resilient element, and piston arrangement that enables operation of the clutch independent of rotation of inner and outer races for the clutch.

BACKGROUND

Wedge friction clutches including inner and outer races and a wedge plate disposed between the inner and outer races are known. It is known to engage and disengage such clutches according to relative rotation of the inner and outer races. However, such an arrangement limits controllability of the clutches. For instance, engaging and disengaging can only be accomplished for specific relative rotation combinations.

SUMMARY

According to aspects illustrated herein, there is provided a wedge friction clutch with onboard enable and disable function, including: an axis of rotation; an inner race; an outer race located radially outward of the inner race; and a wedge assembly including at least one wedge plate located between the inner and outer races in a radial direction; at least one resilient element; and at least one piston. For a locked mode in which the inner and outer races are non-rotatably connected, the at least one resilient element is arranged to displace the at least one wedge plate in at least one first circumferential direction. For a free wheel mode in which the inner and outer races are independently rotatable with respect to each other, the at least one piston is arranged to displace the at least one wedge plate in at least one second circumferential direction.

According to aspects illustrated herein, there is provided a wedge friction clutch with onboard enable and disable function, including: an axis of rotation; an outer race; an inner race located radially inward of the inner race; and a wedge assembly. The wedge assembly includes: at least one wedge plate located between the inner and outer races in a radial direction and including at least one first and second circumferential ends; at least one resilient element; and at least one piston. The at least one wedge plate consists of a single wedge plate, the at least one resilient element consists of a single resilient element, and the at least one piston consists of a single piston. For a locked mode in which the inner and outer races are non-rotatably connected, the at least one resilient element is arranged to displace the wedge plate in a first circumferential direction, and for a free wheel mode in which the inner and outer races are independently rotatable with respect to each other, the at least one piston is arranged to displace the wedge plate in a second circumferential direction, opposite the first circumferential direction; or the at least one wedge plate includes first and second wedge plates, the at least one resilient element includes first and second resilient elements, and the at least one piston includes first and second pistons, for a locked mode in which the inner and outer races are non-rotatably connected the first resilient element is arranged to displace the first wedge plate in a first circumferential direction and the second resilient element is arranged to displace the second wedge plate in the second circumferential direction opposite the first circumferential direction, and for a free wheel mode in which the inner and outer races are independently rotatable with respect to each other the first piston is arranged to displace the first wedge plate in the second circumferential direction and the second piston is arranged to displace the second wedge plate in the first circumferential direction.

According to aspects illustrated herein, there is provided a method of operating a wedge clutch including an axis of rotation, an inner race, an outer race located radially outward of the inner race, and a wedge assembly including a resilient element, a piston, and a wedge plate located between the inner and outer races, the method including: displacing, using the at least one resilient element, the wedge plate in a first circumferential direction; non-rotatably connecting the inner and outer races and the wedge plate; displacing, using the at least one piston, the wedge plate in a second circumferential direction, opposite the first circumferential direction; and separating, in a radial direction, respective surfaces of the inner and outer races and the wedge plate to enable independent rotation of the inner and outer races.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
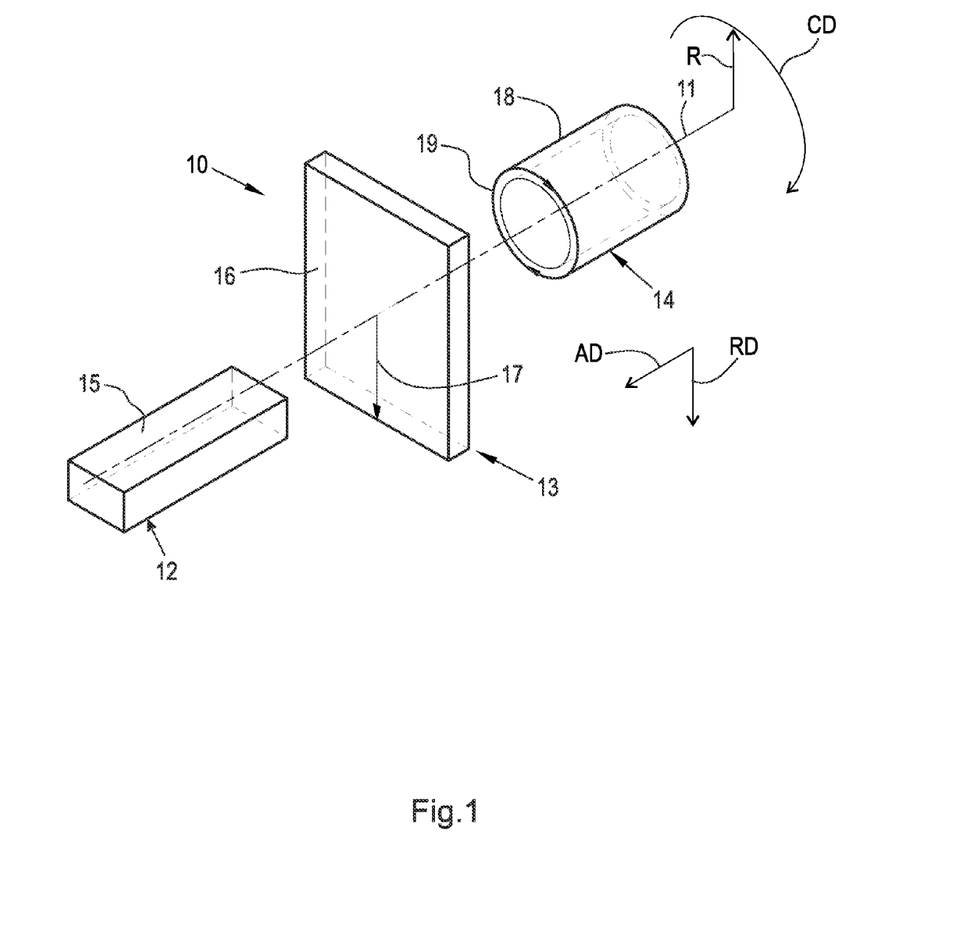
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
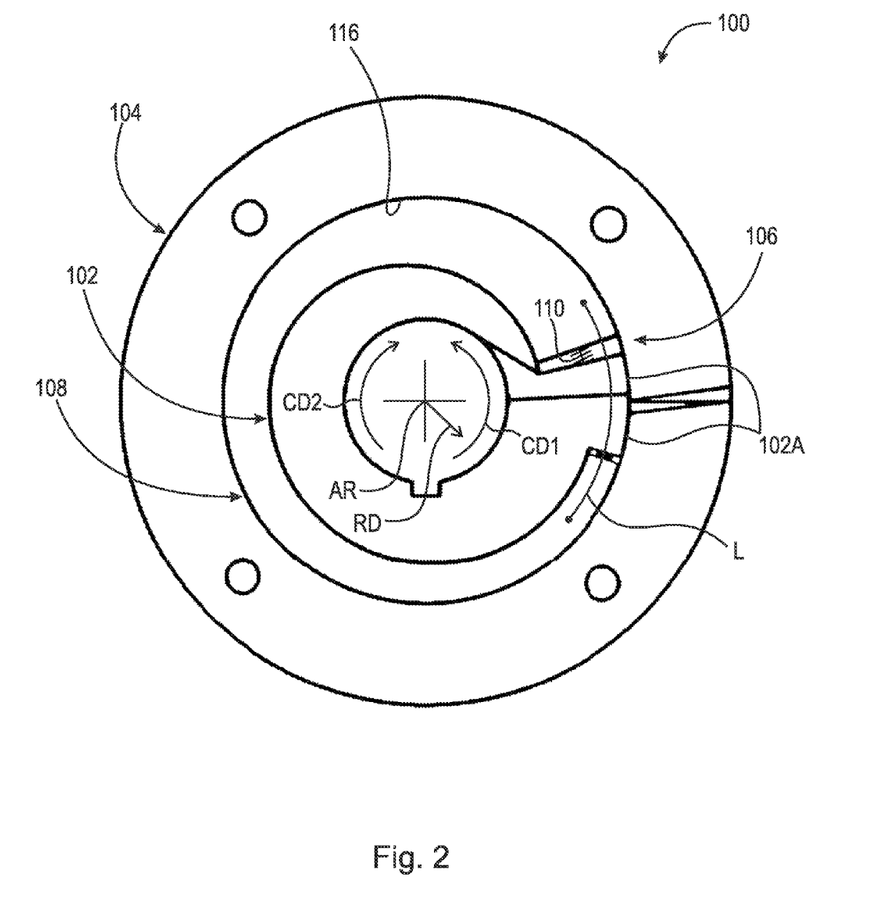
FIG. 2 is a front view of a wedge friction clutch with onboard enable and disable function.

FIG. 2 is a front view of a wedge friction clutch 100 with controllable enable and disable function.

Figure 3:
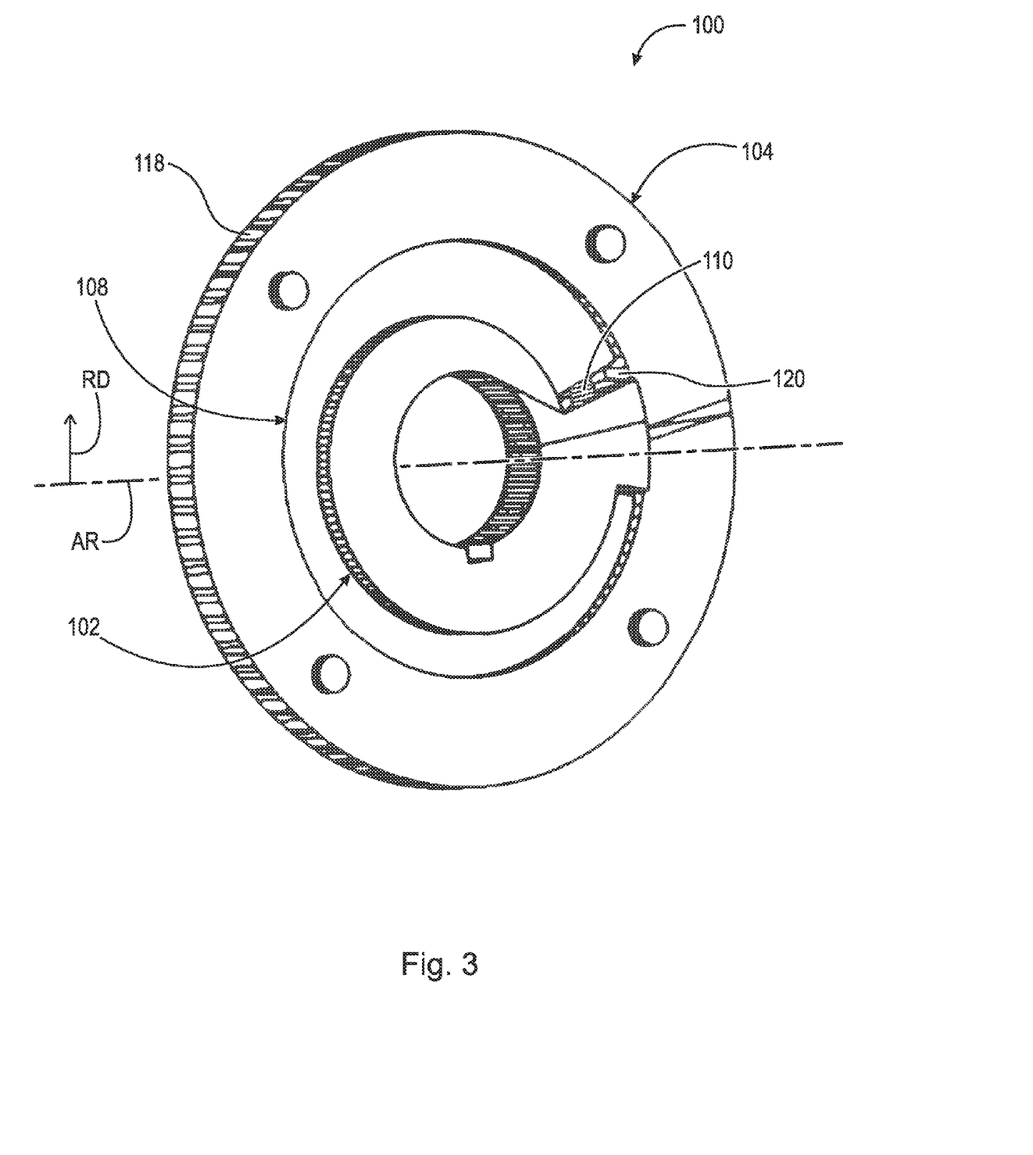
FIG. 3 is a perspective front view of the wedge friction clutch of FIG. 2.

FIG. 3 is a perspective front view of wedge friction clutch 100 of FIG. 2.

Figure 4:
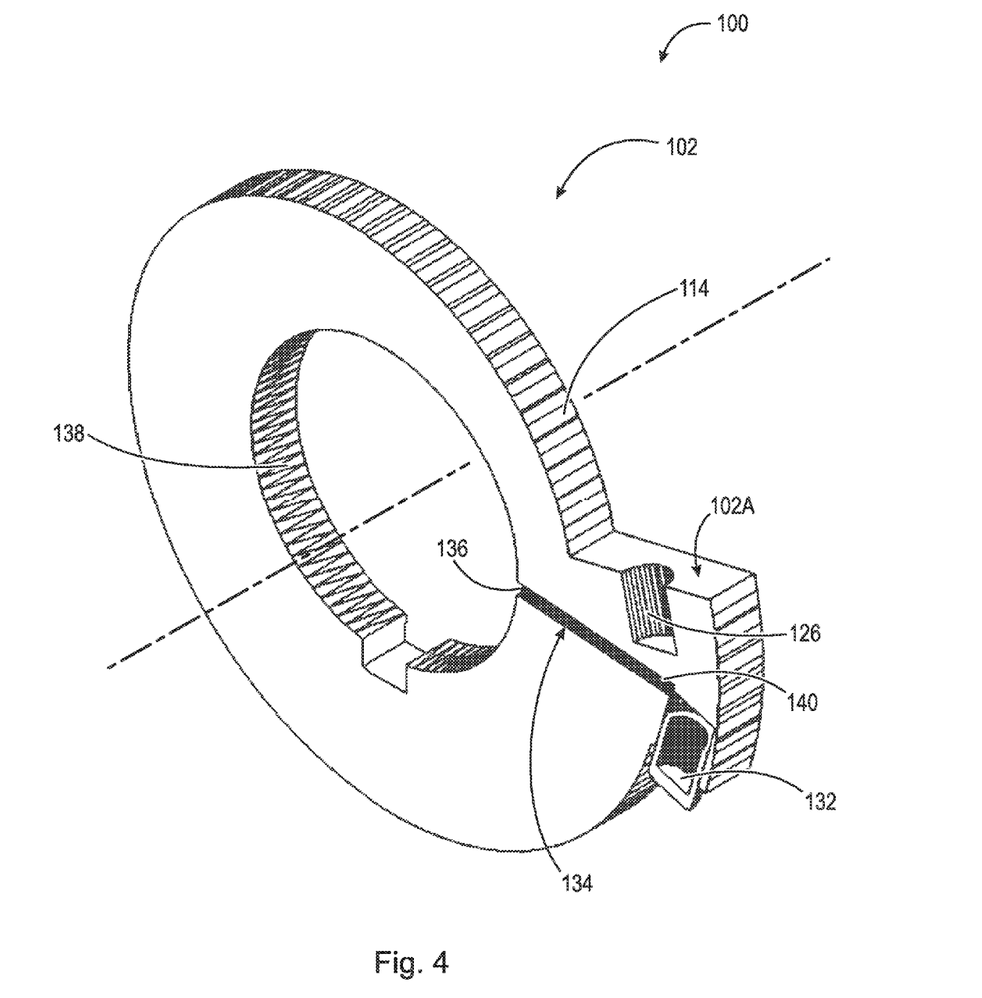
FIG. 4 is a cross-sectional view of the inner race of FIG. 2 along a plane orthogonal to an axis of rotation for the clutch.

FIG. 4 is a cross-sectional view of the inner race of FIG. 2 along a plane orthogonal to an axis of rotation for the clutch.

Figure 5:
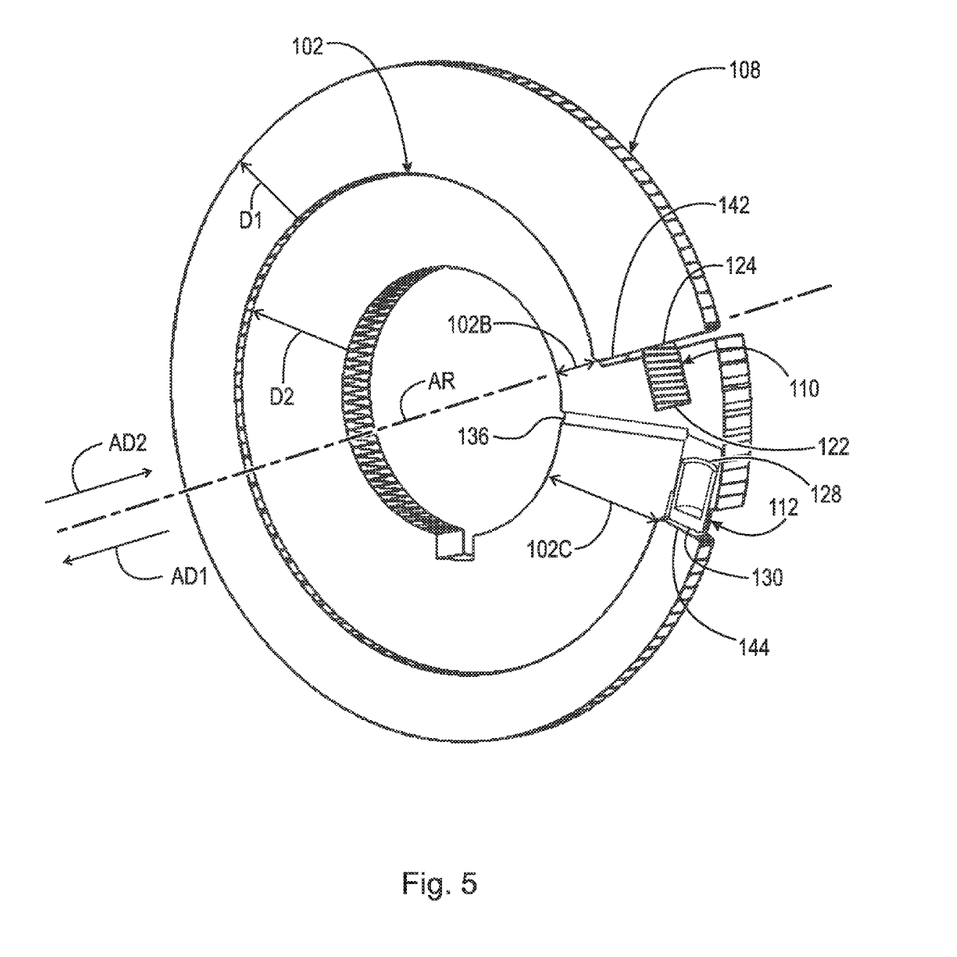
FIG. 5 is a cross-sectional view of the inner race and wedge plate of FIG. 2 along a plane orthogonal to an axis of rotation for the clutch.

FIG. 5 is a cross-sectional view of the inner race and wedge plate of FIG. 2 along a plane orthogonal to an axis of rotation for the clutch. The following should be viewed in light of FIGS. 2 through 5. Wedge friction clutch 100 includes: axis of rotation AR; inner race 102; outer race 104 located radially outward of inner race 102, for example in radial direction RD; and wedge assembly 106. Wedge assembly 106 includes wedge plate 108 located between races 102 and 104 in radial direction RD, resilient element 110 and piston 112. Resilient element 110 is removed from FIG. 4.

For a locked mode in which races 102 and 104 are non-rotatably connected, resilient element 110 is arranged to displace wedge plate 108 in a circumferential direction CD1. For a free wheel mode in which races 102 and 104 are independently rotatable with respect to each other, piston 112 is arranged to displace wedge plate 108 in circumferential direction CD2, opposite circumferential direction CD1.

Inner race 102 includes radially outermost surface 114. Outer race 104 includes radially innermost surface 116. Wedge plate 108 includes radially outermost surface 118 and radially innermost surface 120. For the locked mode: at least respective portions of surfaces 114 and 120 are in contact and non-rotatably connected; and at least respective portions surfaces 116 and 118 are in contact and non-rotatably connected.

Inner race 102 includes portion 102A extending furthest in radial direction RD toward outer race 104. Resilient element 110 includes end 122 engaged with portion 102A and end 124 engaged with wedge plate 108. In an example embodiment, inner race 102, in particular, portion 102A, includes bore 126 and end 122 is disposed in bore 126.

Piston 112 includes ends 128 and 130. End 128 is engaged with inner race 102, in particular portion 102A. In an example embodiment, portion 102A includes chamber 132 and end 128 is disposed in chamber 132. In an example embodiment, inner race includes through-bore 134 including end 136 open to inner circumference 138 of the inner race, and end 140 open to chamber 132. For the free-wheel mode, fluid is supplied to chamber 132 through through-bore 134 to displace piston 112 in circumferential direction CD2 so that end 130 displaces wedge plate 108 in direction CD2. In an example embodiment, to transition from the unlocked mode to the locked mode, resilient element 110 is arranged to displace wedge plate 108 and piston 112 in direction CD1 to force fluid out of chamber 132 through through-bore 134.

Wedge plate 108 includes circumferential ends 142 and 144. Dimension D1 of wedge plate 108, in radial direction RD, decreases moving from end 142 toward end 144 in direction CD1. That is, a radial extent of wedge plate 108 tapers in direction CD1. Inner race 102 includes portions 102B and 102C radially aligned with ends 142 and 144. Dimension D2 of the inner race, in radial direction RD, increases moving from the portion 102B toward portion 102C in direction CD1.

Line L, in direction CD1 or CD2, passes through portion 102A and circumferential ends 142 and 144. In an example embodiment, no portion of wedge assembly 106 extends beyond race 102 or race 104 in opposite axial directions AD1 or AD2.

It should be understood that clutch 100 is not limited to the circumferential orientation shown in FIGS. 2 through 5. For example, the configuration of clutch 100 could be circumferentially reversed so that wedge plate 108 and inner race 102 taper in directions CD2 and CD1, respectively, resilient element 110 urges wedge plate 108 in direction CD2, and piston 112 displaces wedge plate 108 in direction CD1.

Figure 6:
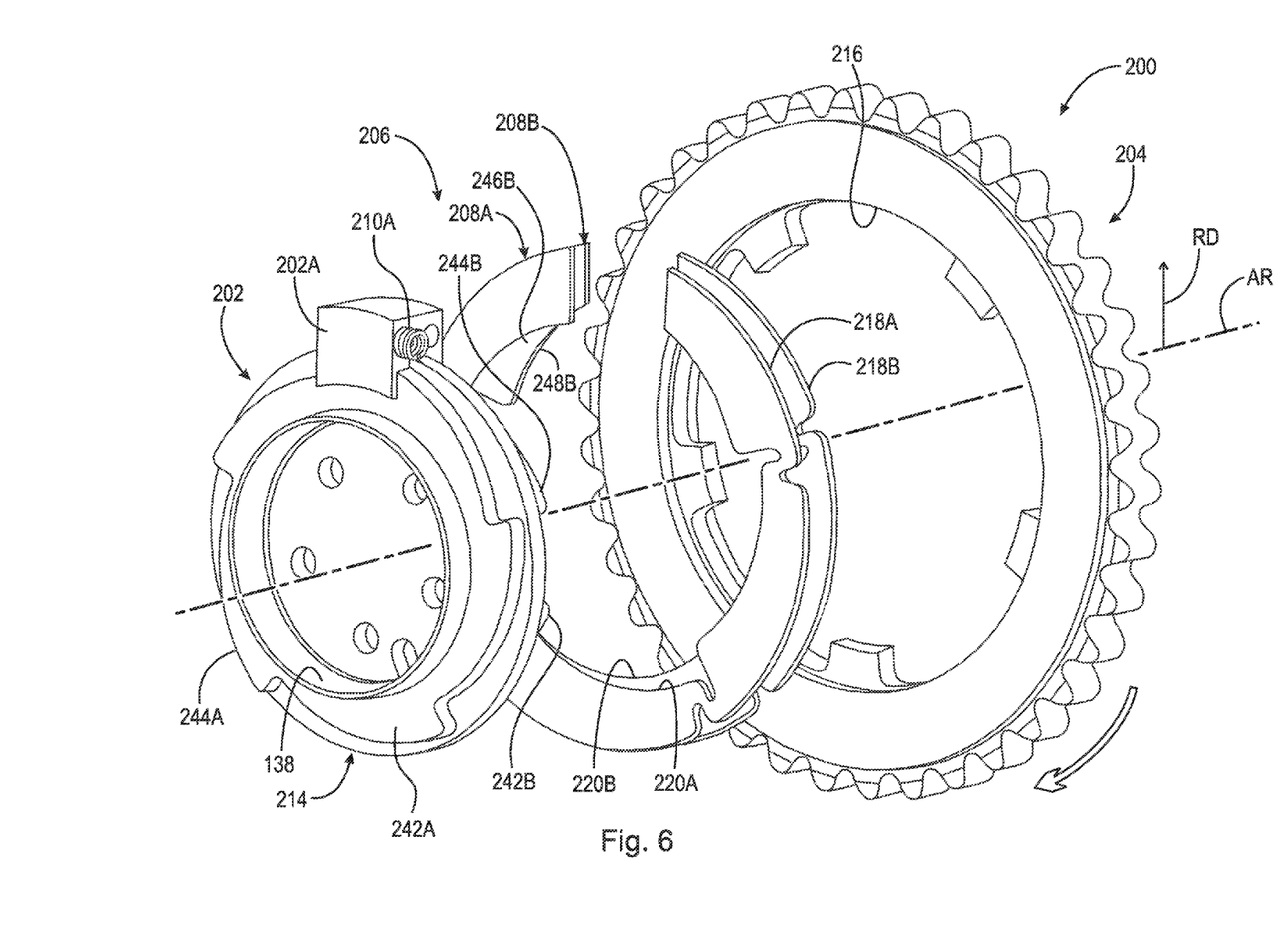
FIG. 6 is an exploded view of a wedge friction clutch with onboard enable and disable function and a hub and wedge plates with respective ramps.

FIG. 6 is an exploded view of wedge friction clutch 200 with onboard enable and disable function and a hub and wedge plates with respective ramps.

Figure 7:
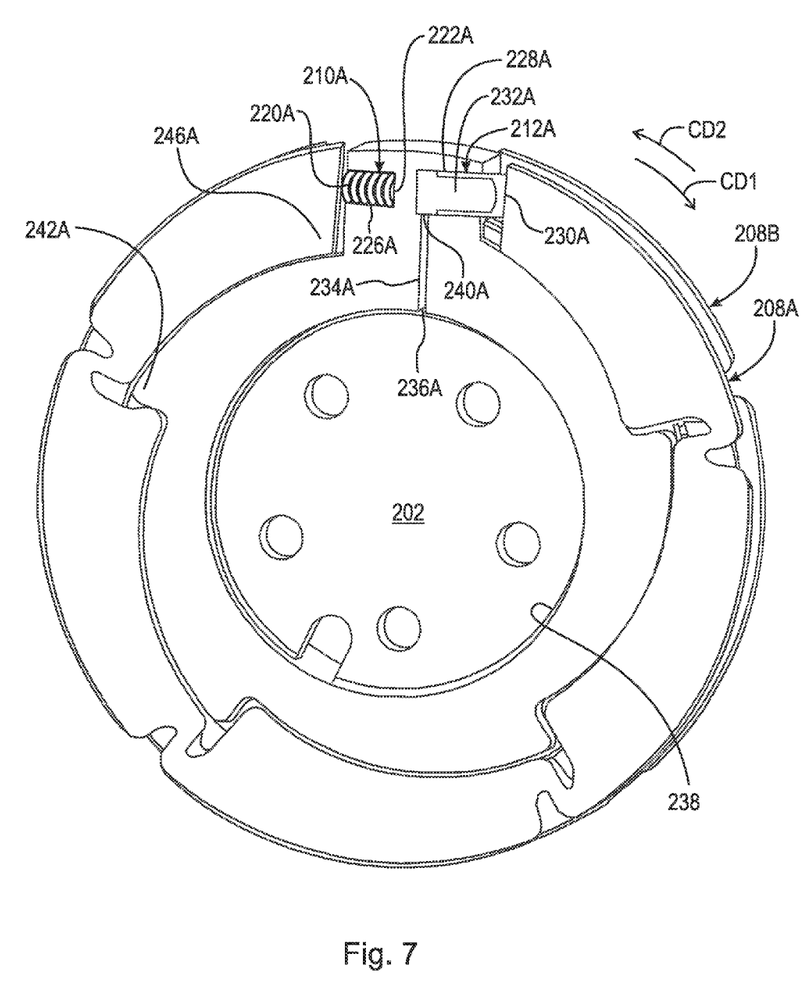
FIG. 7 is a front view of wedge plates and inner race of FIG. 6 with a portion of the inner ring cut-away; and, FIG. 8 is a back view of wedge plates and inner race of FIG. 6 with a portion of the inner ring cut-away.

FIG. 7 is a front view of wedge plates and inner race of FIG. 6 with a portion of the inner ring cut-away.

Figure 8:
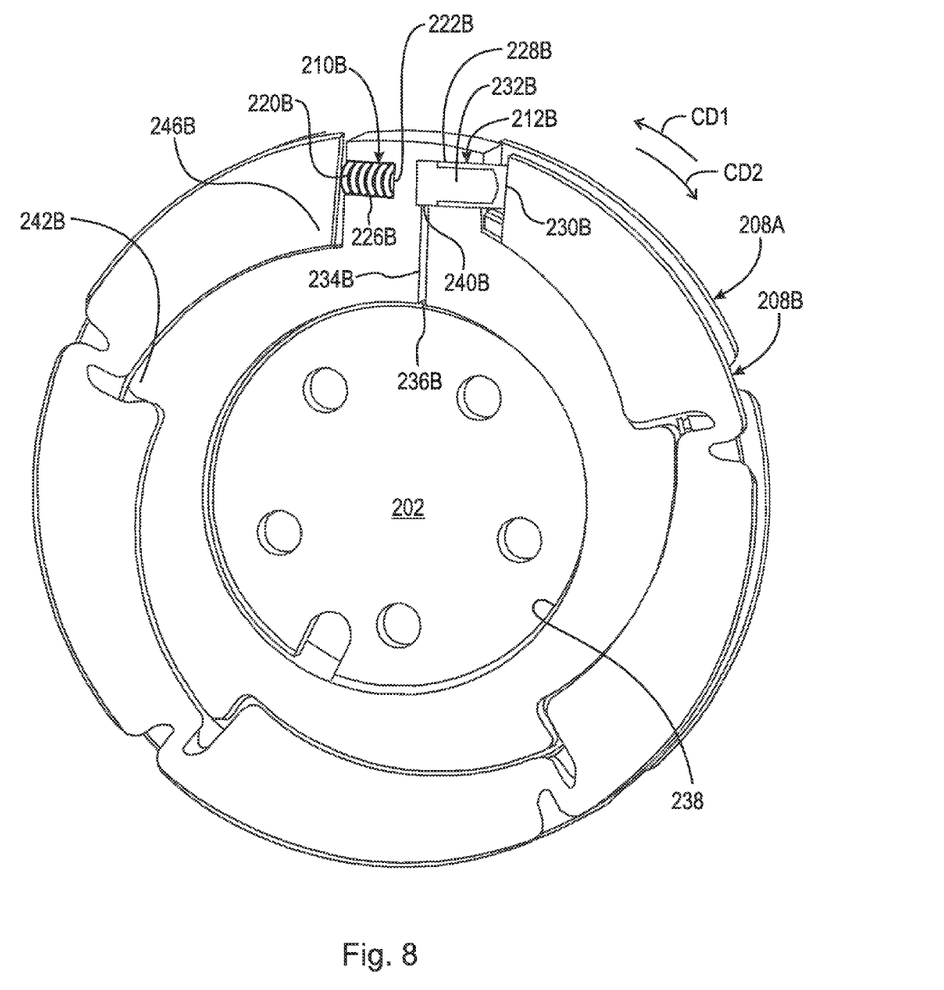

FIG. 8 is a back view of wedge plates and inner race of FIG. 6 with a portion of the inner ring cut-away. The following should be viewed in light of FIGS. 6 through 8. Wedge friction clutch 200 includes: axis of rotation AR; inner race 202; outer race 204 located radially outward of inner race 202, for example in radial direction RD; and wedge assembly 206. Wedge assembly 206 includes wedge plates 208A and 208B located between races 202 and 204 in radial direction RD, resilient elements 210A and 210B, and pistons 212A and 212B.

For a free wheel mode in which races 202 and 204 are independently rotatable with respect to each other, pistons 212A and 212B are arranged to displace wedge plates 208A and 208B in circumferential directions CD1 and CD2, respectively. For a locked mode in which races 202 and 204 are non-rotatably connected, resilient elements 210A and 210B are arranged to displace wedge plates 108B and 208B in circumferential direction CD2 and CD1, respectively.

Inner race 202 includes radially outermost surface 214. Outer race 204 includes radially innermost surface 216. Wedge plates 208A and 208B include radially outermost surface 218A and 218B, respectively, and radially innermost surfaces 220A and 220B, respectively. For the locked mode: at least respective portions of surfaces 214 and 220A and 220B are in contact and non-rotatably connected; and at least respective portions surfaces 216 and 218A and 218B are in contact and non-rotatably connected.

Inner race 202 includes portion 202A extending furthest in radial direction RD toward outer race 204. Resilient elements 210A and 210B include ends 222A and 222B, respectively, engaged with portion 202A and ends 224A and 224B engaged with wedge plates 208A and 208B, respectively. In an example embodiment, inner race 202, in particular, portion 202A, includes bores 226A and 226B and ends 222A and 222B are disposed in bores 226A and 226B, respectively.

Piston 212A includes ends 228A and 230A. Piston 212B includes ends 228B and 230B. Ends 228A and 228B are engaged with inner race 202, in particular portion 202A. In an example embodiment, portion 202A includes chambers 232A and 232B and ends 228A and 228B are disposed in chambers 232A and 232B, respectively. In an example embodiment, inner race includes through-bores 234A and 234B including ends 236A and 236B open to inner circumference 238 of the inner race, and ends 240A and 240B open to chambers 232A and 232B, respectively.

For the free-wheel mode, fluid is supplied to chambers 232A and 232B through through-bores 234A and 234B, respectively, to displace pistons 212A and 212B in circumferential direction CD1 and CD2, respectively, so that end 230A and 230B displace wedge plates 208A and 208B in direction CD1 and CD2, respectively. In an example embodiment, to transition from the unlocked mode to the locked mode, resilient elements 210A and 210B are arranged to displace wedge plates 208A and 208B and pistons 212A and 212B in directions CD2 and CD1, respectively, to force fluid out of chambers 232A and 232B through through-bores 234A and 234B.

Inner race 202, in particular, surface 214 includes ramps 242A and 242B. Respective distances of surfaces 244A and 244B of ramps 242A and 242B, respectively, from axis AR increase in directions CD2 and CD1, respectively. Surfaces 220A and 220B include ramps 246A and 246B, respectively. Respective distances of surfaces 220A and 220B from axis AR increase in directions CD2 and CD1, respectively.

The general function of wedge clutches is known. In particular, for the locking mode, resilient elements 210A and 210B urge ramps 246A and 246B to slide up ramps 242A and 242B, respectively, causing wedge plates 208A and 208B to expand radially outward, non-rotatably connecting races 202 and 204. In particular, for the free wheel mode, pistons 212A and 212B urge ramps 246A and 246B to slide down ramps 242A and 242B, respectively, enabling rotation between races 202 and 204.

It should be understood that clutch 200 is not limited to the circumferential orientation shown in FIGS. 6 through 8. For example, the configuration of clutch 200 could be circumferentially reversed so that: respective distances of surfaces 244A and 244B of ramps 242A and 242B, respectively, from axis AR decrease in directions CD2 and CD1, respectively; and respective distances of surfaces 220A and 220B from axis AR decrease in directions CD2 and CD1, respectively. In the preceding configuration, the circumferential orientation of resilient elements 210A and 210B and pistons 212A and 212B is reversed.

The following should be viewed in light of FIGS. 2 through 5. The following describes a method of operating wedge clutch 100. Although the method is presented as a sequence of steps for clarity, no order should be inferred from the sequence unless explicitly stated. A first step displaces, using resilient element 110, wedge plate 108 in direction CD1. A second step non-rotatably connects races 102 and 104 and wedge plate 108. A third step displaces, using piston 112, wedge plate 108 in direction CD2. A fourth step separates, in radial direction RD, surfaces 116 and 118 and surfaces 120 and 114 to enable independent rotation of races 102 and 104.

A fifth step engages end 122 with portion 102A. A sixth step engages end 124 with end 142. A seventh step disposes end 128 in chamber 132. Displacing wedge plate 108 in direction CD1 includes displacing circumferential end 142 with end 124. Displacing wedge plate 108 in direction CD2 includes: supplying fluid to chamber 132 from through-bore 134; displacing piston 112 direction CD2 in response to the fluid in chamber 132; and displacing end 144 with end 130.

Non-rotatably connecting races 102 and 104 and wedge plate 108 includes bringing into contact and non-rotatably engaging: at least respective portions of surfaces 116 and 118, and at least respective portions of surfaces 114 and 120.

The above method also is applicable to clutch 200.

The following provides further detail regarding wedge friction clutch 100. Advantageously, assembly 106 enables operation of clutch 100 independent of rotation, or non-rotation, of races 102 and 104. That is, wedge assembly 106 is arranged to non-rotatably connect races 102 and 104 in the locked mode regardless of any respective rotation or lack of respective rotation of the races 102 and 104; and clutch 100 is arranged to transition from the locked mode to the unlocked mode regardless of any respective rotation or lack of respective rotation of races 102 and 104. For example, frictional engagement between respective surfaces of wedge plate 108 and respective surfaces of races 102 and 104 is not needed or used to trigger engagement of clutch 100 or initiate disengagement of clutch 100. Thus, clutch 100 is operable under any and all operations of races 102 and 104.

The following provides further detail regarding wedge friction clutch 200. Advantageously, assembly 206 enables operation of clutch 200 for any relative rotation between races 202 and 204. That is, wedge assembly 206 is arranged to non-rotatably connect races 202 and 204 in the locked mode for any relative rotation between races 202 and 204; and clutch 200 is arranged to transition from the locked mode to the unlocked mode for any relative rotation of races 202 and 204.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A wedge friction clutch with onboard enable and disable function, comprising:
   an axis of rotation;
   an inner race;
   an outer race located radially outward of the inner race; and,
   a wedge assembly including:
      at least one wedge plate located between the inner and outer races in a radial direction;
      at least one resilient element; and,
      at least one piston, wherein:
   for a locked mode in which the inner and outer races are non-rotatably connected, the at least one resilient element is arranged to displace the at least one wedge plate in one of a first or a second circumferential direction; and,
   for a free wheel mode in which the inner and outer races are independently rotatable with respect to each other, the at least one piston is arranged to displace the at least one wedge plate in the other of the first or second circumferential direction.

2. The friction wedge clutch of claim 1, wherein:
   the inner race includes a first radially outermost surface;
   the outer race includes a first radially innermost surface;
   the at least one wedge plate includes at least one second radially outermost surface and at least one second radially innermost surface; and,
   for the locked mode:
      at least respective portions of the first radially innermost surface and the at least one second radially outermost surface are in contact and non-rotatably connected; and,
      at least respective portions of the first radially outermost surface and the at least one radially second innermost surface are in contact and non-rotatably connected.

3. The friction wedge clutch of claim 1, wherein:
   the wedge assembly is arranged to non-rotatably connect the inner and outer races in the locked mode for any respective rotation or lack of respective rotation of the inner and outer races; and,
   the wedge assembly is arranged to transition from the locked mode to the unlocked mode for any respective rotation or lack of respective rotation of the inner and outer races.

4. The friction wedge clutch of claim 1, wherein:
   the radial direction is toward the outer race;
   the inner race includes a portion extending furthest in the radial direction; and,
   the at least one resilient element includes:
      at least one first end engaged with the portion; and,
      at least one second end engaged with the at least one wedge plate.

5. The friction wedge clutch of claim 4, wherein:
   the portion of the inner race includes at least one bore; and,
   the at least one first end of the at least one resilient element is disposed in the at least one bore.

6. The friction wedge clutch of claim 1, wherein:
   the radial direction is toward the outer race;
   the inner race includes a portion extending furthest in the radial direction;
   the at least one piston includes at least one first end engaged with the portion;
   the portion of the inner race includes at least one chamber; and,
   the at least one first end of the at least one piston is disposed in the at least one chamber.

7. The friction wedge clutch of claim 6, wherein:
   the at least one piston includes at least one second end;
   the inner race includes at least one through-bore including:
      at least one first end open to an inner circumference of the inner race; and,
      at least one second end open to the at least one chamber; and,
   for the free-wheel mode, fluid is supplied to the at least one chamber through the at least one through-bore to displace the at least one piston in the other of the first or second circumferential direction to contact the at least one second end of the at least one piston with the at least one wedge plate.

8. The friction wedge clutch of claim 7, wherein to transition from the free wheel mode to the locked mode, the at least one resilient element is arranged to displace the at least one wedge plate and the at least one piston in the one of the first or the second circumferential direction to force the fluid out of the at least one chamber through the at least one through-bore.

9. The friction wedge clutch of claim 1, wherein:
   the at least one wedge plate includes one only single wedge plate with first and second circumferential ends; and,
   a dimension of the one only single wedge plate, in the radial direction, decreases moving from the first circumferential end to the second circumferential end.

10. The friction wedge clutch of claim 1, wherein:
    the radial direction is toward the outer race;
    the at least one wedge plate includes at least one first circumferential end and at least one second circumferential end; and,
    the inner race includes a portion extending furthest in the radial direction and disposed between the at least one first and second circumferential ends such that a line, in the first or second circumferential direction, passes through the portion and the at least one first and second circumferential ends.

11. The friction wedge clutch of claim 1, wherein:
    the at least one wedge plate includes first and second wedge plates;
    the at least one resilient element includes first and second resilient elements engaged with the first and second wedge plates, respectively;
    the at least one piston includes first and second pistons;
    for the locked mode:
       the first resilient element is arranged to displace the first wedge plate in the first circumferential direction; and,
       the second resilient element is arranged to displace the second wedge plate in the second circumferential direction;
    and,
    for the free wheel mode:
       the first piston is arranged to displace the first wedge plate in the second circumferential direction; and,
       the second piston is arranged to displace the second wedge plate in the first circumferential direction.

12. The friction wedge clutch of claim 11, wherein:
the first wedge plate includes a first inner circumferential surface including a first plurality of ramps;
the second wedge plate includes a second inner circumferential surface including a second plurality of ramps;
the inner race includes a first outer circumferential surface including third and fourth pluralities of ramps;
for the locked mode:
the first resilient element is arranged to slide the first plurality of ramps up the third plurality of ramps; and,
the second resilient element is arranged to slide the second plurality of ramps up the fourth plurality of ramps; and,
for the free wheel mode:
the first piston is arranged to slide the first plurality of ramps down the third plurality of ramps; and,
the second piston is arranged to slide the second plurality of ramps down the fourth plurality of ramps.

13. A wedge friction clutch with onboard enable and disable function, comprising:
an axis of rotation;
an outer race;
an inner race located radially inward of the inner race; and,
a wedge assembly including:
at least one wedge plate:
located between the inner and outer races in a radial direction; and,
including at least one first circumferential end and at least one second circumferential end;
at least one resilient element; and
at least one piston,
wherein:
the at least one wedge plate consists of a single wedge plate, the at least one resilient element consists of a single resilient element, and the at least one piston consists of a single piston;
for a locked mode in which the inner and outer races are non-rotatably connected, the single resilient element is arranged to displace the single wedge plate in a first circumferential direction; and,
for a free wheel mode in which the inner and outer races are independently rotatable with respect to each other, the single piston is arranged to displace the single wedge plate in a second circumferential direction, opposite the first circumferential direction; or,
wherein:
the at least one wedge plate includes first and second wedge plates, the at least one resilient element includes first and second resilient elements, and the at least one piston includes first and second pistons;
for a locked mode in which the inner and outer races are non-rotatably connected:
the first resilient element is arranged to displace the first wedge plate in a first circumferential direction; and,
the second resilient element is arranged to displace the second wedge plate in a second circumferential direction opposite the first circumferential direction; and,
for a free wheel mode in which the inner and outer races are independently rotatable with respect to each other:
the first piston is arranged to displace the first wedge plate in the second circumferential direction; and,
the second piston is arranged to displace the second wedge plate in the first circumferential direction.

14. The friction wedge clutch of claim 13, wherein:
the radial direction is toward the outer race;
the at least one wedge plate consists of the single wedge plate and the at least one resilient element consists of the single resilient element;
the inner race includes a portion extending furthest in the radial direction;
the portion of the inner race includes a bore; and,
the single resilient element includes:
a first end disposed in the bore; and,
a second end engaged with the single wedge plate.

15. The friction wedge clutch of claim 13, wherein:
the radial direction is toward the outer race;
the at least one wedge plate consists of the single wedge plate and the at least one piston consists of the single piston;
the inner race includes a portion extending furthest in the radial direction;
the portion of the inner race includes a chamber;
the inner race includes a through-bore including:
a first end open to an inner circumference of the inner race; and,
a second end open to the chamber;
the single piston includes:
a first end disposed in the through-bore; and,
a second end engaged with the single wedge plate; and,
for the free wheel mode, fluid is transmitted through the through-bore to the chamber to circumferentially displace the single piston.

16. The friction wedge clutch of claim 13, wherein:
the at least one wedge plate consists of the single wedge plate;
the single wedge plate includes first and second circumferential ends; and,
a dimension of the single wedge plate, in the radial direction, decreases moving from the first circumferential end to the second circumferential end.

17. The friction wedge clutch of claim 13, wherein:
the at least one wedge plate includes the first and second wedge plates;
the at least one resilient element includes the first and second resilient elements, which are engaged with the first and second wedge plates, respectively;
the at least one piston includes the first and second pistons, which are engaged with the first and second wedge plates, respectively;
for the locked mode:
the first resilient element is arranged to displace the first wedge plate in the first circumferential direction; and,
the second resilient element is arranged to displace the second wedge plate in the second circumferential direction; and,
for the free wheel mode:
the first piston is arranged to displace the first wedge plate in the second circumferential direction; and,
the second piston is arranged to displace the second wedge plate in the first circumferential direction.

18. A method of operating a wedge clutch including an axis of rotation, an inner race, an outer race located radially outward of the inner race, and a wedge assembly including a resilient element, a piston, and a wedge plate located between the inner and outer races, the method comprising:

displacing, using the resilient element, the wedge plate in a first circumferential direction;
non-rotatably connecting the inner and outer races and the wedge plate;
displacing, using the piston, the wedge plate in a second circumferential direction, opposite the first circumferential direction; and,
separating, in a radial direction, respective surfaces of the inner and outer races and the wedge plate to enable independent rotation of the inner and outer races.

19. The method of claim 18 further comprising:
engaging a first end of the resilient element with a portion of the inner race extending furthest in a radial direction toward the outer race;
engaging a second end of the resilient element with a first circumferential end of the wedge plate; and,
disposing a first end of the piston in a chamber in the portion of the inner race, wherein:
   displacing the wedge plate in the first circumferential direction includes displacing the first circumferential end of the wedge plate with the second end of the resilient element; and,
   displacing the wedge plate in the second circumferential direction includes:
      supplying fluid to the chamber from a through-bore linking an inner circumference of the inner race and the chamber;
      displacing the piston in the second circumferential direction in response to the fluid in the chamber; and,
      displacing a second circumferential end of the wedge plate with a second end of the piston.

20. The method of claim 18 wherein non-rotatably connecting the inner and outer races and the wedge plate includes bringing into contact and non-rotatably engaging:
   at least a portion of a first radially outermost surface for the inner race with at least a portion of a first radially innermost surface for the wedge plate; and,
   at least a portion of a second radially outermost surface for the wedge plate with at least a portion of second radially innermost surface for the outer race.

* * * * *